O. LINKE.
DIRECT DRAFT AND HOLDUP WAGON GEAR REACH.
APPLICATION FILED JUNE 20, 1912.
1,051,603.
Patented Jan. 28, 1913.
2 SHEETS—SHEET 1.
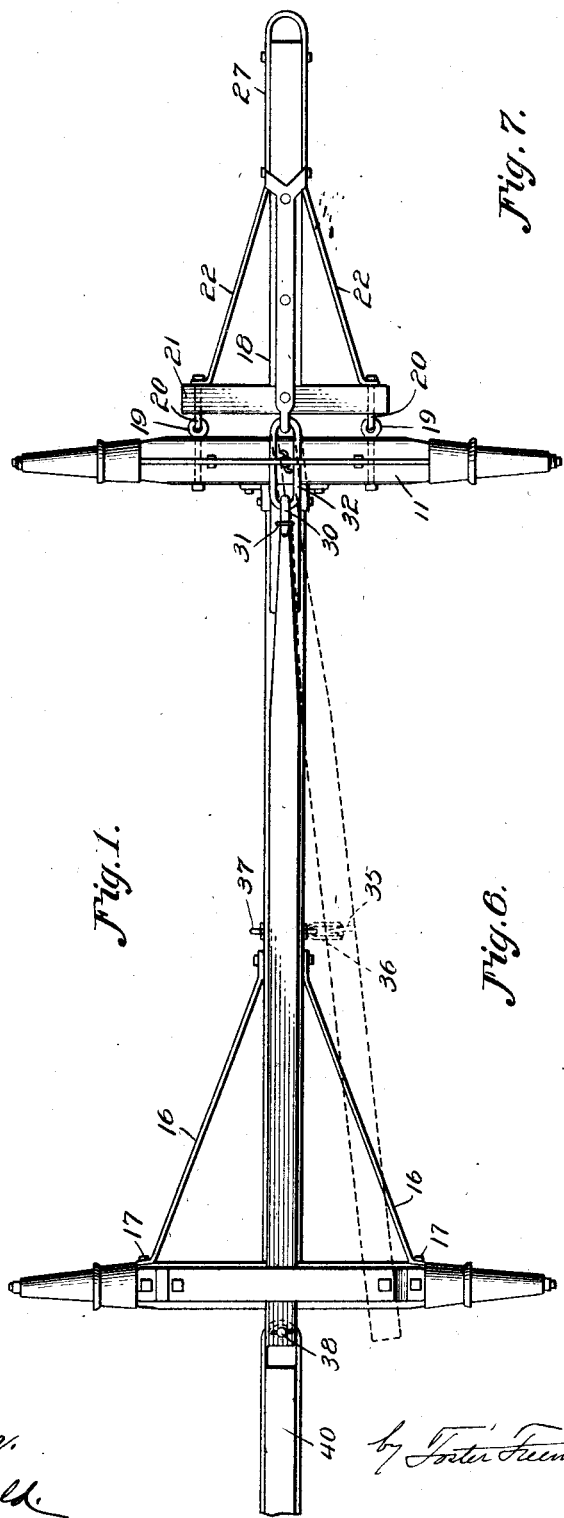
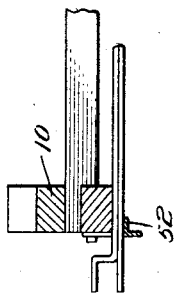
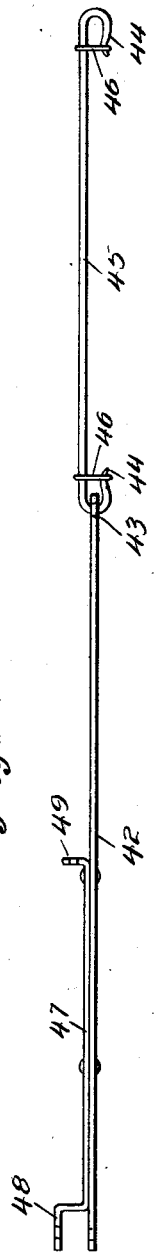
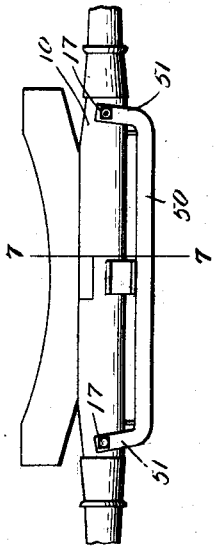
Witnesses
F. C. Gibson.
E. L. Greenewald.
Inventor
Otto Linke
by Foster Freeman Watson & Coit
Attorneys

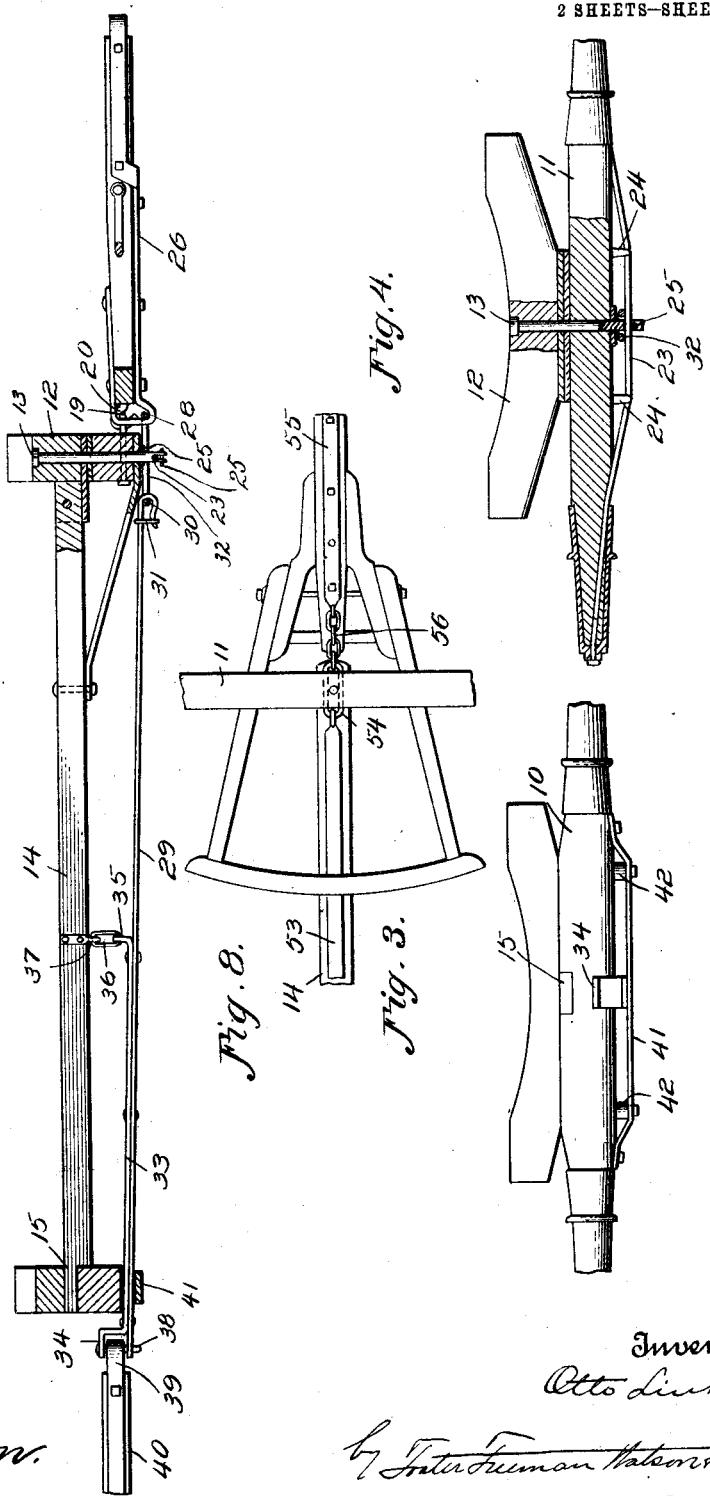

UNITED STATES PATENT OFFICE.

OTTO LINKE, OF DURBIN, NORTH DAKOTA.

DIRECT-DRAFT AND HOLDUP WAGON-GEAR REACH.

1,051,603.　　　　　Specification of Letters Patent.　　Patented Jan. 28, 1913.

Application filed June 20, 1912. Serial No. 704,900.

*To all whom it may concern:*

Be it known that I, OTTO LINKE, a citizen of the United States, residing at Durbin, Cass county, State of North Dakota, have invented certain new and useful Improvements in Direct-Draft and Holdup Wagon-Gear Reaches, of which the following is a specification.

This invention relates to draft devices and more particularly to an arrangement by means of which the draft applied at the forward end of the vehicle may be applied to a vehicle or vehicles following without transmitting the strain or tension through the first gear. For example, in a threshing outfit which includes a threshing engine, tender, threshing machine and any other vehicle desired the draft of the engine may be applied to the tender, the thresher and other vehicles directly so that there will be no tendency to pull any of the vehicles apart and so that they may readily round curves.

It is one of the objects of this invention to provide a simple and inexpensive draft device which may readily be applied to most vehicles now on the market.

Other objects and the novel features of the invention will be apparent from the following description taken in connection with the accompanying drawings, in which:

Figure 1 is a bottom plan view of a portion of a tender truck running gear showing my invention applied thereto. Fig. 2 is a longitudinal sectional view of the device shown in Fig. 1. Fig. 3 is a rear view of the rear axle showing the draft device and hold-up applied thereto. Fig. 4 is a view of the front axle, part being shown in section. Fig. 5 is a side view of a modified form of the auxiliary draft device. Fig. 6 is a rear view of the rear axle showing a modified form of hold-up applied thereto. Fig. 7 is a vertical sectional view along line 7—7 of Fig. 6. Fig. 8 is a bottom plan view of part of an ordinary farm wagon showing the auxiliary draft device applied to the main draft member.

In the drawings the improved device is shown as applied to the draft member of a tender for a threshing engine and the draft member of a threshing machine or other vehicle is connected thereto.

The numerals 10 and 11 designate the rear and front axles respectively of an ordinary vehicle. The front axle 11 is designed to support a bolster 12 thereon in the well known manner and the said bolster is connected to the axle by means of a suitable king bolt 13 which extends centrally through both the bolster and axle and projects a short distance below the axle for a purpose to be presently set forth. At its front end, the ordinary or main reach 14 is secured to the bolster 12, the said reach extending rearwardly and being connected to the rear axle 11. The rear axle is slightly mortised at 15 to receive the end of the reach 14 which is suitably connected to both axles. Bracing members 16 bolted to the reach and axle as shown are provided to strengthen the structure at the rear end. Bolts 17 pass through a foot on each of the brace rods 16 and pass through the axle 10 at opposite sides of the center.

The tongue or draft member 18 is T-shaped and is connected to the front axle 11 by any suitable means such as the interlocking eye bolts 19 and 20, the bolts 19 being connected to the axle 11 and the hooks 20 connected to the cross bar 21 of the main draft member 18, thus forming a flexible connection. Additional braces 22 serve to brace the outer end of the cross head 21.

The front axle 11 is provided with the ordinary truss construction which comprises a truss rod 23 suitably secured at the outer ends of the axle and passing through the axle skeins beneath the axle over the lugs 24, 24 to space the rod a slight distance from the lower edge of the axle. The king bolt 13 is provided with a forked lower end which embraces the rod 23 and a cotter pin 25 serves to hold the rod within the forked end and permits the removal of the king bolt whenever desired.

My improvement consists in connecting an additional draft member to the tongue 18 so that the draft applied to the tongue may be transmitted to vehicles following without causing any pulling apart tendency in the front gear. The auxiliary or additional draft member is preferably constructed of strap iron of a suitable thickness to resist the strains. Rigidly secured to the tongue 18 there is a onepiece member 26 to which the draft is applied and which reinforces the tongue 18. The member 26 comprises a front portion 27 formed into a loop and integrally connected to a rearwardly extending portion bent upon itself to form a hook 28 at the rear end of the tongue. The member 26 is bolted to the tongue and the looped end affords means for readily connecting the truck to the engine.

Extending rearwardly normally in a parallel line with the reach 14 there is a single bar of strap iron 29 which has a hook 30 at its forward end and a loose ring 31 is sprung over the end of the hook to releasably connect the draft member 29 to a link 32. The link 32 forms a flexible connection between the member 29 and the member 26. The link embraces the king bolt 13 at its lower end and is centered thereby and held from dropping down or displacement by the truss rod 23 and the connection of the latter with the king bolt. The flexible connection thus formed is necessary in turning or on uneven roads.

The draft member 29 has a strap 33 welded and riveted thereto at its rear end. The strap 33 has an offset portion 34 which provides a forked end at the rear end of the member 29. At the forward end of the strap 33 there is a projection which has an eye 35 formed therein to receive the end of a chain 36 secured to the yoke 37 on the reach 14, thus forming a flexible connection between the reach and draft 29 intermediate the axles and serving to support the member 29 at or near the center. The forked end of the member 29 has eyes to receive a bolt 38 by means of which the loop 39 on the tongue 40 of a following vehicle may be connected to the draft member 29. The loop 39 may correspond to the loop 27 on the member 26 secured to the tongue 18 of the tender truck and may have connected thereto a similar draft device to that shown for the tender truck in case it is desired to connect more vehicles in the train. The rear end of the draft member 29 is supported by a hold-up or stirrup 41 which is offset a slight distance from the bottom edge of the rear axle 10 and bolted thereto at its ends. The draft member 29 is capable of sliding along the surface of the hold-up 41 into a position on either side of the center, as indicated in dotted lines in Fig. 1. To prevent the shearing off of the bolts securing the hold-up 41 to the axle 10, bushings 42 are provided for bolts set slightly in from the outer securing means.

Fig. 5 discloses a slight modification of the draft member in which a more flexible connection is provided. The straight bar 42 has an eye 43 at its forward end into which one of the hooked ends 44, 44 of a bar 45 engages. The loose rings 46, 46 slide over the hooks to prevent the bar from rattling off. The other hooked end of the bar 45 is connected to the link 32 in a similar manner to the hook 30 of the draft member 29. The bar 42 of the draft member shown in Fig. 5 has secured thereto a strap 47 and the offset portion 48 at one end and a projecting portion 49 at the other end formed with an eye therein. The offset portion forms a forked end for the bar 42 to receive the draft member of a vehicle following and the eye 49 in the member 47 may be connected to a chain to support the rod 42.

Figs. 6 and 7 show a modified form of hold-up or stirrup which is formed of angle iron. The stirrup comprises a vertical section 50 and two upwardly or substantially parallel ends 51 by means of which the hold-up is bolted to the axle 10, the bolt 17 serving to secure the hold-up as well as the brace rods 16 to the axle. At right angles to the vertical section 50 there is a horizontal section 52 along which the draft member may slide from side to side of the vehicle as curves are rounded.

In Fig. 8 the invention is shown as embodied in a common farm wagon. The auxiliary draft device 53 is connected to the link 54, but instead of being beneath the axle 11 is located above the said axle and underneath the ordinary reach 14. A strap of iron 55 is connected with the link 54 by a number of short chain links 56 which construction allows a freer play of the wagon tongue.

It is believed that the operation of the device will be clear from the foregoing description.

By the arrangement shown and described I have provided a simple means of applying the draft to a number of wagons in train without transmitting the strain through any one of the vehicle bodies as would be the case in a threshing outfit. Where a number of vehicles are to be drawn by the engine no single one of the vehicles will be subjected to excessive strains which might result in the pulling apart of the vehicle. The direct draft and hold-up can readily be applied to any ordinary wagon gear on the market and is of inexpensive construction.

As numerous minor changes may be made without departing from the spirit of the invention it is not intended that the invention shall be limited to the exact details as shown and described.

Having thus described the invention what is claimed as new is:

1. In a vehicle, the combination with the front and rear axles, of a reach between the axles, a main draft device connected to the front axle, an auxiliary draft member connected to the main draft device and terminating near the rear of the vehicle, and means for supporting the rear end of said auxiliary member so that said end may move laterally along and beneath the rear axle.

2. In a vehicle, the combination with the front and rear axles, of a reach between the axles, a main draft device connected to the front axle, an auxiliary draft member flexibly connected to the main draft device, extending rearwardly and terminating behind the rear axle, means for connecting the draft device of another vehicle to said member, and means for loosely and slidably supporting said member adjacent its rear end so that said rear end may move laterally along the rear axle.

3. In a vehicle, the combination with the front and rear axles, of a reach between the axles, a main draft device connected to the front axle, an auxiliary draft member flexibly and releasably connected to the main draft device, normally extending rearwardly parallel to the reach and terminating behind the rear axle, means for flexibly connecting the draft device of another vehicle to said member whereby said other vehicle receives its draft directly from said main draft device, and means on the rear axle for loosely supporting the member adjacent its rear end.

4. In a vehicle, the combination with the front and rear axles, of a reach between the axles, a main draft device connected to the front axle, an auxiliary draft member extending rearwardly normally parallel to the reach and terminating behind the rear axle, means on the front axle for flexibly connecting the auxiliary draft member to the main draft device, means for flexibly connecting the draft device of another vehicle to said member whereby said other vehicle receives its draft directly from said main draft device, and means on the rear axle for loosely supporting the rear end of said member to slide lengthwise along the rear axle.

5. In a vehicle, the combination with the front and rear axles, of a reach between said axles, a tongue connected to the front axle, and an auxiliary draft device extending to the rear of the vehicle comprising a rearwardly extending member connected to the tongue, a forwardly extending member having its rear end loosely supported by the rear axle, means for flexibly connecting the members, means on the front axle for supporting the connecting means, means on the rear end of said forwardly extending member to connect the draft device of another vehicle thereto, and means at the front end of the forwardly extending member to releasably connect said member to the flexible connecting means.

6. In a vehicle, the combination with the front and rear axles, of a reach between the axles, a main draft device connected to the front axle, an auxiliary draft device extending to and projecting beyond the rear of the vehicle and normally parallel to the reach and comprising a member rigidly connected to the main draft device, another member having its rear end slidably supported by the rear axle, detachable and flexible connecting means between said members, means on the rear end of said other member for connecting the draft device of another vehicle thereto, and means on the front axle for supporting the connecting means.

In testimony whereof I affix my signature in presence of two witnesses.

OTTO LINKE.

Witnesses:
W. F. KITTEL,
L. E. FARRELL.